(12) United States Patent
Takahagi (10) Patent No.: US 10,964,983 B2
(45) Date of Patent: *Mar. 30, 2021

(54) PACKAGING MATERIAL FOR BATTERIES, METHOD FOR PRODUCING SAME, AND BATTERY

(71) Applicant: DAI NIPPON PRINTING CO., LTD., Tokyo (JP)

(72) Inventor: Atsuko Takahagi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,383

(22) Filed: May 10, 2019

(65) Prior Publication Data

US 2019/0267581 A1    Aug. 29, 2019

Related U.S. Application Data

(63) Continuation of application No. 15/557,660, filed as application No. PCT/JP2016/059744 on Mar. 25, 2016, now Pat. No. 10,347,876.

(30) Foreign Application Priority Data

Mar. 27, 2015  (JP) .................................. 2015-066282

(51) Int. Cl.
*H01M 10/02* (2006.01)
*H01M 50/116* (2021.01)
(Continued)

(52) U.S. Cl.
CPC ............. *H01M 50/116* (2021.01); *B32B 7/02* (2013.01); *B32B 7/12* (2013.01); *B32B 15/06* (2013.01);
(Continued)

(58) Field of Classification Search
CPC ...... H01M 2/02; H01M 10/02; H01M 2/0257; H01M 2/026; H01M 2/0275;
(Continued)

(56) References Cited

U.S. PATENT DOCUMENTS

2008/0286635 A1* 11/2008 Seino ...................... B32B 15/08
429/94
2014/0072864 A1* 3/2014 Suzuta ..................... B32B 27/20
429/176

(Continued)

FOREIGN PATENT DOCUMENTS

EP    3 188 278 A1    7/2017
JP    2006-228653 A    8/2006
(Continued)

OTHER PUBLICATIONS

Decision to grant a Patent issued by SIPO (Year: 2020).*
(Continued)

*Primary Examiner* — Alexander Usyatinsky
(74) *Attorney, Agent, or Firm* — Oliff PLC (57) ABSTRACT

A packaging material for batteries, which is not susceptible to the formation of a pinhole or cracking during the forming, while having excellent formability, and is effectively suppressed in curling after the forming, which is formed of a laminate with at least a base layer, an adhesive layer, a metal layer and a thermally fusible resin layer in this order, and wherein: the tensile modulus of elasticity of the base layer in one direction and the tensile modulus of elasticity of the base layer in a perpendicular direction in the same plane are both within the range of from 400 N/15 mm to 1,000 N/15 mm (inclusive); and the absolute value of the difference between the tensile modulus of elasticity of the base layer in the one direction and the tensile modulus of elasticity of the base layer in the other is 150 N/15 mm or less.

11 Claims, 2 Drawing Sheets

(51) Int. Cl.
| | |
|---|---|
| B32B 15/08 | (2006.01) |
| H01G 11/78 | (2013.01) |
| B32B 15/088 | (2006.01) |
| B32B 15/085 | (2006.01) |
| B32B 15/082 | (2006.01) |
| B32B 15/06 | (2006.01) |
| B32B 23/04 | (2006.01) |
| B32B 7/12 | (2006.01) |
| B32B 15/095 | (2006.01) |
| B32B 15/09 | (2006.01) |
| B32B 15/20 | (2006.01) |
| B32B 15/092 | (2006.01) |
| B32B 23/08 | (2006.01) |
| B32B 15/098 | (2006.01) |
| B32B 27/36 | (2006.01) |
| B32B 27/30 | (2006.01) |
| B32B 27/32 | (2006.01) |
| B32B 25/08 | (2006.01) |
| B32B 27/28 | (2006.01) |
| B32B 25/16 | (2006.01) |
| B32B 27/38 | (2006.01) |
| B32B 25/14 | (2006.01) |
| B32B 27/34 | (2006.01) |
| B32B 27/40 | (2006.01) |
| B32B 27/42 | (2006.01) |
| H01M 50/10 | (2021.01) |
| H01M 50/124 | (2021.01) |
| B32B 7/02 | (2019.01) |
| B32B 27/08 | (2006.01) |
| H01M 50/131 | (2021.01) |

(52) U.S. Cl.
CPC ............ *B32B 15/08* (2013.01); *B32B 15/082* (2013.01); *B32B 15/085* (2013.01); *B32B 15/088* (2013.01); *B32B 15/09* (2013.01); *B32B 15/092* (2013.01); *B32B 15/095* (2013.01); *B32B 15/098* (2013.01); *B32B 15/20* (2013.01); *B32B 23/042* (2013.01); *B32B 23/08* (2013.01); *B32B 25/08* (2013.01); *B32B 25/14* (2013.01); *B32B 25/16* (2013.01); *B32B 27/08* (2013.01); *B32B 27/28* (2013.01); *B32B 27/281* (2013.01); *B32B 27/283* (2013.01); *B32B 27/285* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *H01G 11/78* (2013.01); *H01M 10/02* (2013.01); *H01M 50/10* (2021.01); *H01M 50/124* (2021.01); *B32B 2250/04* (2013.01); *B32B 2255/06* (2013.01); *B32B 2255/10* (2013.01); *B32B 2255/205* (2013.01); *B32B 2255/26* (2013.01); *B32B 2270/00* (2013.01); *B32B 2307/31* (2013.01); *B32B 2307/51* (2013.01); *B32B 2307/518* (2013.01); *B32B 2307/54* (2013.01); *B32B 2307/71* (2013.01); *B32B 2307/714* (2013.01); *B32B 2307/7244* (2013.01); *B32B 2307/7246* (2013.01); *B32B 2307/732* (2013.01); *B32B 2571/00* (2013.01); *H01M 50/131* (2021.01); *H01M 2300/0097* (2013.01); *Y02E 60/13* (2013.01); *Y02T 10/70* (2013.01)

(58) Field of Classification Search
CPC ............ H01M 2/0277; H01M 2/0287; H01M 2002/0297; H01M 2300/0097; B32B 27/08; B32B 7/02; B32B 15/08; H01G 11/78; Y02T 10/7022; Y02E 60/13
See application file for complete search history.

(56) References Cited

U.S. PATENT DOCUMENTS

| | | |
|---|---|---|
| 2015/0050549 A1 | 2/2015 | Taniguchi |
| 2015/0155531 A1 | 6/2015 | Takahagi et al. |
| 2017/0077465 A1 | 3/2017 | Taniguchi |
| 2017/0125749 A1 | 5/2017 | Takahagi et al. |

FOREIGN PATENT DOCUMENTS

| | | | |
|---|---|---|---|
| JP | 2008-287971 A | | 11/2008 |
| JP | 2014-017266 A | | 1/2014 |
| JP | 2014017266 | * | 1/2014 |
| JP | 2014-069384 A | | 4/2014 |
| JP | 2015-107583 A | | 6/2015 |
| WO | 2012/153847 A1 | | 11/2012 |
| WO | WO 2012153847 | * | 11/2012 |
| WO | 2013/168731 A1 | | 11/2013 |
| WO | 2013/183511 A1 | | 12/2013 |
| WO | 2016/031758 A1 | | 3/2016 |

OTHER PUBLICATIONS

Decision to grant a Patent issued by JPO (Year: 2020).*
Jun. 28, 2016 International Search Report issued in International Patent Application No. PCT/JP2016/059744.

* cited by examiner

PACKAGING MATERIAL FOR BATTERIES, METHOD FOR PRODUCING SAME, AND BATTERY

This is a continuation application of U.S. patent application Ser. No. 15/557,660, filed on Sep. 12, 2017, which is a national stage entry of PCT/JP2016/059744, filed on May 25, 2016, which claims priority to JP 2015-066282, filed Mar. 27, 2015. The disclosures of each of these applications are hereby incorporated by reference in their entireties.

TECHNICAL FIELD

The present invention relates to a battery packaging material, a method for producing the battery packaging material, and a battery.

BACKGROUND ART

Various types of batteries have been developed heretofore, and in every battery, a packaging material is an essential member for sealing battery elements such as an electrode and an electrolyte. Metallic packaging materials have been often used heretofore as battery packagings.

On the other hand, in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, there has been proposed a film-shaped laminate with a base material, a metal layer and a heat-sealable resin layer laminated in this order has been proposed as a battery packaging material which is easily processed into diversified shapes and is capable of achieving thickness reduction and weight reduction.

In such a battery packaging material, generally, a concave portion is formed by cold molding, battery elements such as an electrode and an electrolytic solution are disposed in a space formed by the concave portion, and heat-sealable resin layers are heat-welded to obtain a battery with battery elements stored in the battery packaging material. However, such a film-shaped packaging material is thinner as compared to a metallic packaging material, and has the disadvantage that pinholes and cracks are easily generated during molding. If pinholes and cracks are generated in a battery packaging material, an electrolytic solution may permeate to a metal layer to form a metal precipitate, resulting in generation of a short-circuit, and therefore it is absolutely necessary that a film-shaped battery packaging material have a property that makes it hard to generate pinholes during molding, i.e. excellent moldability.

For example, Patent Document 1 discloses that in a laminated packaging material which includes an inner layer including a resin film; a first adhesive agent layer; a metal layer; a second adhesive agent layer; and an outer layer including a resin film, at least one of the first adhesive agent layer and the second adhesive agent layer is formed of an adhesive agent composition containing a resin having an active hydrogen group on the side chain, a polyfunctional isocyanate and a polyfunctional amine compound to give a packaging material having high reliability in deeper molding.

PRIOR ART DOCUMENT

Patent Document

Patent Document 1: Japanese Patent Laid-open Publication No. 2008-287971

SUMMARY OF THE INVENTION

Problems to be Solved by the Invention

In recent years, a battery packaging material has been desired to have a further reduced thickness as batteries have been required to have a reduced size and thickness. However, when the thickness of the battery packaging material decreases (to, for example, 100 µm or less), the peripheral edge of a concave portion formed on the battery packaging material is curled (curved), so that storage of a battery element and heat-welding of a heat-sealable resin layer may be hindered, leading to deterioration of production efficiency of the battery. Particularly, a battery packaging material to be used in a large secondary battery such as a secondary battery for use in automobiles has the problem that since the battery packaging material has a large size, the impact of curling on productivity of batteries is very large.

There is also the problem that when the thickness of a battery packaging material decreases (to, for example, 100 µm or less), pinholes and cracks are very easily generated in a metal layer during molding.

Under these circumstances, a main object of the present invention is to provide a battery packaging material including a laminate including at least a base material layer, an adhesive layer, a metal layer and a heat-sealable resin layer in this order, the battery packaging material having excellent moldability with pinholes and cracks hardly generated during molding, and being effectively inhibited from curling after molding.

Means for Solving the Problems

The present inventor has extensively conducted studies for achieving the above-mentioned object. Resultantly, the present inventor has found that when in a battery packaging material including a laminate including at least a base material layer, an adhesive layer, a metal layer and a heat-sealable resin layer in this order, the tensile elastic modulus of the base material layer in each of one direction and the other direction orthogonal to the one direction on the same plane is 400 N/15 mm or more and 1000 N/15 mm or less, and the absolute value of a difference between the tensile elastic moduli of the base material layer in the one direction and the other direction is 150 N/15 mm or less, surprisingly the battery packaging material has excellent moldability with pinholes and cracks hardly generated during molding of the battery packaging material, and is effectively inhibited from curling after molding. The present invention has been completed by further conducting studies based on the above-mentioned findings.

That is, the present invention provides a battery packaging material and a battery of the following aspects.

Item 1. A battery packaging material including a laminate including at least a base material layer, an adhesive layer, a metal layer and a heat-sealable resin layer in this order, wherein a tensile elastic modulus of the base material layer in each of one direction and other direction orthogonal to the one direction on the same plane is 400 N/15 mm or more and 1000 N/15 mm or less, and an absolute value of a difference between the tensile elastic moduli of the base material layer in the one direction and the other direction is 150 N/15 mm or less.

Item 2. The battery packaging material according to item 1, wherein in the metal layer, each of a yield strength A in a tension test conducted in one direction and a yield strength B in a tension test conducted in other direction orthogonal to the one direction on the same plane is 20 N/15 mm or more and 70 N/15 mm or less, and an absolute value of a difference between the yield strength A and the yield strength B is 2 N/15 mm or less.

Item 3. The battery packaging material according to item 1 or 2, wherein a thickness of the laminate is 100 μm or less.

Item 4. The battery packaging material according to any one of items 1 to 3, wherein a thickness of the base material layer is 10 μm or more and 35 μm or less.

Item 5. The battery packaging material according to any one of items 1 to 4, wherein a thickness of the metal layer is 10 μm or more and 35 μm or less.

Item 6. The battery packaging material according to any one of items 1 to 5, wherein the base material layer contains at least one of a polyester resin and a polyamide.

Item 7. The battery packaging material according to any one of items 1 to 6, wherein at least one surface of the metal layer is subjected to a chemical conversion treatment.

Item 8. The battery packaging material according to any one of items 1 to 7, wherein the battery packaging material is a packaging material for a secondary battery.

Item 9. A battery, wherein a battery element including at least a positive electrode, a negative electrode and an electrolyte is stored in a package formed of the battery packaging material according to any one of items 1 to 8.

Item 10. A method for producing a battery packaging material, the method including the step of preparing a laminate by laminating at least a base material layer, an adhesive layer, a metal layer and a heat-sealable resin layer in this order, the base material layer having the following properties: a tensile elastic modulus of the base material layer in each of one direction and other direction is 400 N/15 mm or more and 1000 N/15 mm or less, and an absolute value of a difference between the tensile elastic moduli of the base material layer in one direction and other direction orthogonal to the one direction on the same plane is 150 N/15 mm or less.

Advantages of the Invention

According to the present invention, there is provided a battery packaging material including a laminate including at least a base material layer, an adhesive layer, a metal layer and a heat-sealable resin layer in this order, wherein the tensile elastic modulus of the base material layer in each of one direction and the other direction orthogonal to the one direction on the same plane is 400 N/15 mm or more and 1000 N/15 mm or less, and the absolute value of a difference between the tensile elastic moduli in the one direction and the other direction is 150 N/15 mm or less. The battery packaging material has excellent moldability with pinholes and cracks hardly generated during molding of the battery packaging material, and is effectively inhibited from curling after molding. Since the battery packaging material according to the present invention has excellent moldability, and is inhibited from curling, the battery packaging material can contribute to improvement of productivity of batteries.

EMBODIMENTS OF THE INVENTION

A battery packaging material according to the present invention is a battery packaging material including a laminate including at least a base material layer, an adhesive layer, a metal layer and a heat-sealable resin layer in this order, wherein a tensile elastic modulus of the base material layer in each of one direction and other direction orthogonal to the one direction (direction perpendicular to the thickness of the base material layer) on the same plane is 400 N/15 mm or more and 1000 N/15 mm or less, and the absolute value of a difference between the tensile elastic moduli of the base material layer in the one direction and the other direction is 150 N/15 mm or less. Hereinafter, the battery packaging material according to the present invention will be described in detail.

1. Laminated Structure of Battery Packaging Material

Figure 1:
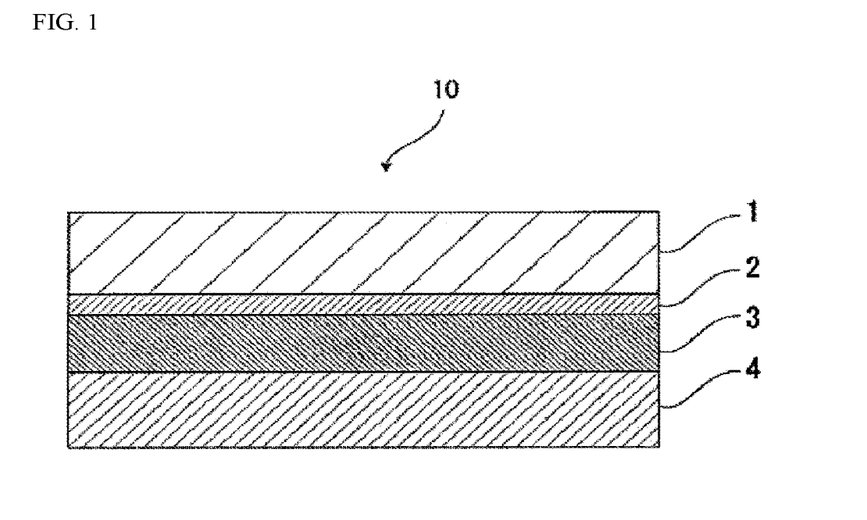
FIG. 1 is a drawing showing one example of a cross-sectional structure of a battery packaging material according to the present invention.

The battery packaging material according to the present invention includes a laminate including at least a base material layer 1, an adhesive layer 2, a metal layer 3 and a heat-sealable resin layer 4 in this order as shown in FIG. 1. In the battery packaging material according to the present invention, the base material layer 1 is an outermost layer, and the heat-sealable resin layer 4 is an innermost layer. That is, at the time of assembling a battery, the heat-sealable resin layer 4 situated on the periphery of a battery element is heat-welded with itself to hermetically seal the battery element, so that the battery element is encapsulated.

Figure 2:
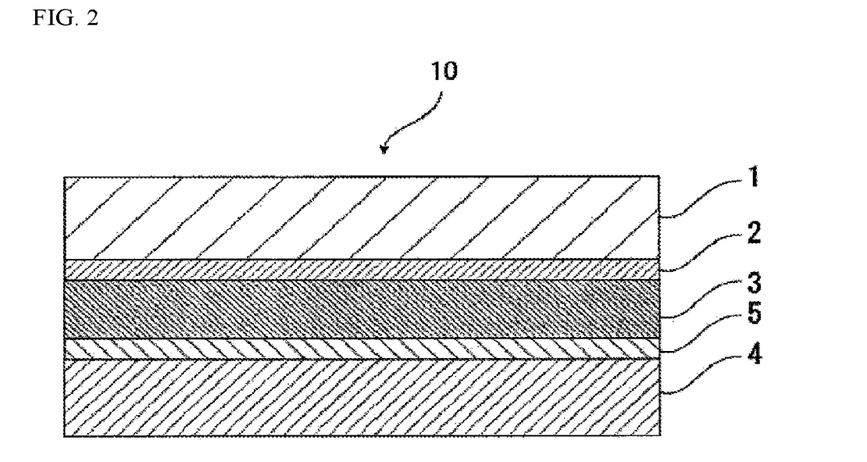
FIG. 2 is a drawing showing one example of a cross-sectional structure of a battery packaging material according to the present invention.

As shown in FIG. 2, the battery packaging material according to the present invention may be provided with an adhesive layer 5 between the metal layer 3 and the heat-sealable resin layer 4 as necessary in order to improve adhesiveness of these layers.

The thickness of the laminate that forms the battery packaging material according to the present invention is not particularly limited, but it is preferably 100 μm or less, more preferably about 60 μm or more and 100 μm or less for ensuring that the battery packaging material has excellent moldability, and is inhibited from curling after molding while having a small thickness. According to the present invention, generation of pinholes in molding and curling after molding can be effectively suppressed even when the laminate that forms the battery packaging material according to the present invention has a very small thickness of, for example, 100 μm or less. Accordingly, the battery packaging material according to the present invention can contribute to improvement of the energy density of the battery while suppressing deterioration of productivity of the battery.

2. Layers forming Battery Packaging Material

[Base Material Layer 1]

In the battery packaging material according to the present invention, the base material layer 1 is a layer that forms the outermost layer. In the present invention, the tensile elastic modulus of the base material layer 1 in each of one direction (direction perpendicular to the thickness of the base material layer) and other direction orthogonal to the one direction on the same plane is 400 N/15 mm or more and 1000 N/15 mm or less. The absolute value of a difference between the tensile elastic moduli of the base material layer 1 in one direction and the other direction is 150 N/15 mm or less. The battery packaging material according to the present invention includes a laminate including at least the base material layer 1, the adhesive layer 2, the metal layer 3 and the heat-sealable resin layer 4 in this order, and the base material layer 1 has a specific tensile elastic modulus as described above. Thus, the battery packaging material has excellent moldability with pinholes and cracks hardly generated during molding, and being effectively inhibited from curling after molding.

The detailed mechanism in which the battery packaging material has excellent moldability, and curling (curvature) after molding is effectively suppressed because the base material layer has the above-mentioned specific tensile elastic modulus is not evident, but may be considered as follows, for example. In the present invention, since the tensile elastic modulus of the base material layer 1 in each of one direction and other direction orthogonal to the one direction on the same plane is 400 N/15 mm or more and 1000 N/15 mm or less, and the absolute value of a difference between the tensile elastic moduli of the base material layer 1 in the one direction and the other direction is 150 N/15 mm or less, the tensile elastic modulus of the base material layer 1 is set to a moderate value, and the difference between the tensile elastic moduli in the one direction and the other direction is small. Thus, it is considered that the base material layer 1 appropriately controls elongation of the metal layer 3, and resultantly, the battery packaging material has excellent moldability, and is effectively inhibited from curling after molding.

It is considered that when the tensile elastic modulus of the base material layer 1 is below 400 N/15 mm, the capability of controlling elongation of the metal layer during molding is low, so that the metal layer is partially elongated more than necessary, resulting in generation of pinholes and cracks. It is considered that since the base material layer 1 has a small tensile elastic modulus, the battery packaging material has reduced resilience, and thus easily curls at the periphery of a recess portion after molding (see FIG. 4). Particularly, when the battery packaging material has a very small thickness of, for example, 100 μm or less, the battery packaging material has extremely reduced resilience, and therefore easily curls when the tensile elastic modulus of the base material layer 1 is below 400 N/15 mm.

It is considered that when the tensile elastic modulus of the base material layer 1 exceeds 1000 N/15 mm, the capability of controlling elongation of the metal layer during molding is excessively high, so that the metal layer is not appropriately elongated, and thus during molding, a large force is partially applied, so that pinholes and cracks are easily generated.

It is considered that when the absolute value of a difference between the tensile elastic moduli of the base material layer 1 in the one direction and the other direction exceeds 150 N/15 mm, there is a large difference between ease of elongation in the one direction and ease of elongation in the other direction during molding, so that the metal layer is not unidirectionally elongated, and thus pinholes and cracks are easily generated.

For effectively inhibiting the battery packaging material from curling after molding while imparting excellent moldability to the battery packaging material, the tensile elastic modulus of the base material layer 1 in each of the one direction and the other direction is preferably 450 N/15 mm or more and 800 N/15 mm or less, more preferably 500 N/15 mm or more and 700 N/15 mm or less.

From the same point of view, the absolute value of a difference between the tensile elastic moduli of the base material layer 1 in the one direction and the other direction is preferably 100 N/15 mm or less, more preferably 80 N/15 mm or less.

In the present invention, the tensile elastic modulus of the base material layer 1 is measured by a method conforming to JIS K7161-1994.

Figure 3:
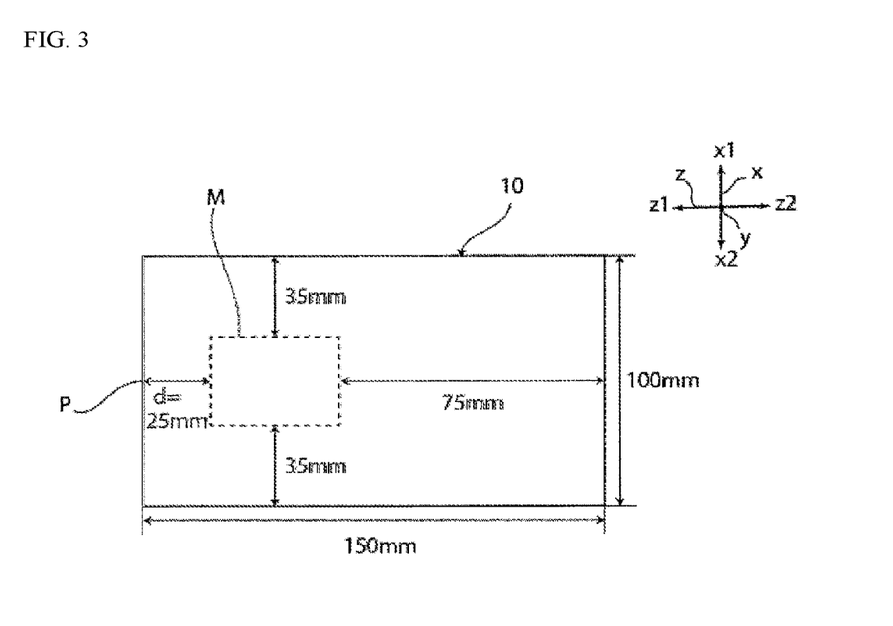
FIG. 3 is a schematic view for explaining a method for evaluation on curling.
Figure 4:
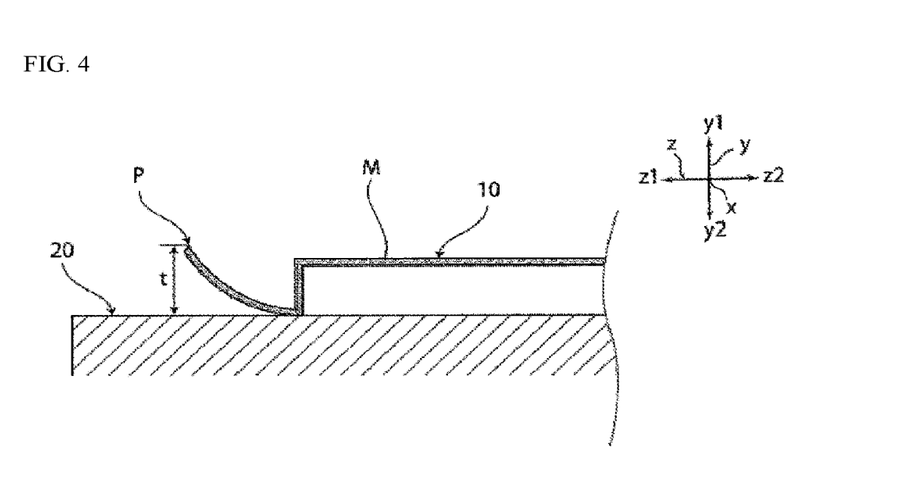
FIG. 4 is a schematic view for explaining a method for evaluation on curling.

In the present invention, evaluation on curling of the battery packaging material after molding can be performed by a method as described in examples (see FIGS. 3 and 4).

The material that forms the base material layer 1 is not particularly limited as long as it has the above-mentioned properties, and insulation quality. Examples of the material that forms the base material layer 1 include resins films of polyester resin, polyamide resin, epoxy resin, acrylic resin, fluororesin, polyurethane resin, silicone resin, phenol resin and mixtures and copolymers thereof. Among them, a polyester resin and a polyamide resin are preferred, and a biaxially stretched polyester resin and a biaxially stretched polyamide resin are more preferred. Specific examples of the polyester resin include polyethylene terephthalate, polybutylene terephthalate, polyethylene naphthalate, polybutylene naphthalate, copolyester and polycarbonate. Specific examples of the polyamide resin include nylon 6, nylon 6,6, a copolymer of nylon 6 and nylon 6,6, nylon 6,10, and polymethaxylyleneadipamide (MXD6).

The base material layer 1 may be formed of a single layer resin film, or may be formed of a resin film having two or more layers for improving pinhole resistance and an insulation quality. For example, when the base material layer 1 is formed from two resin films, a structure of polyester resin/polyamide resin is preferred, and a structure of polyethylene terephthalate/nylon is more preferred. In the laminated structure, it is preferable that the base material layer 1 is laminated so as to situate a polyester resin or polyethylene terephthalate at an outermost layer.

When the base material layer 1 is to be formed of a multilayer resin film, two or more resin films may be laminated together with an adhesive component such as an adhesive agent or an adhesive resin interposed therebetween, and the kind, amount and so on of the adhesive component to be used are similar to those for the later-described adhesive layer 2. The method for laminating a resin film having two or more layers is not particularly limited, and a known method can be employed. Examples thereof include a dry lamination method and a sand lamination method, and a dry lamination method is preferred. When the resin film is laminated by a dry lamination method, it is preferred to use a urethane-based adhesive agent as the adhesive layer. Here, the thickness of the adhesive layer is, for example, about 2 μm or more and 5 μm or less.

While the thickness of the base material layer 1 is not particularly limited as long as a function as a base material layer is performed, and the battery packaging material satisfies the above-mentioned properties, it is, for example, about 10 μm or more and 50 μm or less, preferably about 10 μm or more and 35 μm or less.

[Adhesive Layer 2]

In the battery packaging material according to the present invention, the adhesive layer 2 is a layer provided between the base material layer 1 and the metal layer 3 for strongly bonding these layers to each other.

The adhesive layer 2 is formed from an adhesive capable of bonding the base material layer 1 and the metal layer 3. The adhesive used for forming the adhesive layer 2 may be a two-liquid curable adhesive, or may be a one-liquid curable adhesive. Further, the adhesion mechanism of the adhesive agent used for forming the adhesive layer 2 is not particularly limited, and may be any one of a chemical reaction type, a solvent volatilization type, a heat melting type, a heat pressing type and so on.

Specific examples of the adhesive component that can be used for forming the adhesive layer 2 include polyester-based resins such as polyethylene terephthalate, polybutylene terephthalate, polyethylene naphthalate, polybutylene naphthalate, polyethylene isophthalate, polycarbonate and a copolyester; polyether-based adhesive agents; polyurethane-based adhesive agents; epoxy-based resins; phenol resin-based resins; polyamide-based resins such as nylon 6, nylon 66, nylon 12 and a copolymerized polyamide; polyolefin-based resins such as a polyolefin, a carboxylic acid-modified polyolefin and a metal-modified polyolefin, and a polyvinyl acetate-based resin; cellulose-based adhesive agents; (meth) acryl-based resins; polyimide-based resins; amino resins such as a urea resin and a melamine resin; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesives are preferred.

While the thickness of the adhesive layer 2 is not particularly limited as long as a function as an adhesive layer is performed, and the battery packaging material satisfies the above-mentioned properties, it is, for example, about 1 μm or more and 10 μm or less, preferably about 2 μm or more and 5 μm or less.

[Metal Layer 3]

In the battery packaging material, the metal layer 3 is a layer that is intended to improve the strength of the battery packaging material, and also functions as a barrier layer for preventing ingress of water vapor, oxygen, light and the like into the battery. Specific examples of the metal forming the metal layer 3 include aluminum, stainless and titanium, with aluminum being preferred. The metal layer 3 can be formed from metal foil or by metal deposition, and is preferably formed from metal foil, more preferably from aluminum foil. From the viewpoint of preventing generation of wrinkles and pinholes in the metal layer 3 during production of the battery packaging material, it is more preferred to form the metal layer 3 from soft aluminum foil such as annealed aluminum (JIS H4160 A8021H-O, JIS H4160 A8079H-O, JIS H4000:2014 A8021P-O, JIS H4000:2014 A8079P-O).

In the present invention, it is preferable that in the metal layer 3, each of a yield strength A in a tension test conducted in one direction (direction perpendicular to the thickness direction of the metal layer) and a yield strength B in a tension test conducted in other direction orthogonal to the one direction on the same plane is 20 N/15 mm or more and 70 N/15 mm or less. Preferably, the absolute value of a difference between the yield strength A and the yield strength B is 2 N/15 mm or less. It is considered that since the base material layer 1 has the above-mentioned specific tensile elastic modulus, and the metal layer 3 has such a specific yield strength, the balance of elongation of the base material layer 1 and the metal layer 3 during molding of the battery packaging material is improved, and thus generation of pinholes and cracks, and occurrence of curling after molding are further effectively suppressed.

For effectively inhibiting the battery packaging material from curling after molding while imparting excellent moldability to the battery packaging material, the yield strength of the metal layer 3 in each of the one direction and the other direction is preferably 25 N/15 mm or more and 60 N/15 mm or less, more preferably 30 N/15 mm or more and 50 N/15 mm or less.

From the same point of view, the absolute value of a difference between the yield strengths of the metal layer 3 in the one direction and the other direction is preferably 1.5 N/15 mm or less, more preferably 1.0 N/15 mm or less.

In the present invention, the yield strength of the metal layer 3 is measured by a tension test (total elongation method) defined in JIS Z 2241.

While the thickness of the metal layer 3 is not particularly limited as long as a function as a barrier layer to water vapor is performed, it may be, for example, about 10 or more and 50 μm or less, preferably about 10 μm or more and 35 μm or less.

Preferably, the metal layer 3 has an acid resistance film layer formed by a chemical conversion treatment on at least one surface, preferably both surfaces for stabilization of bonding, prevention of dissolution and corrosion, and so on. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4). In the aminated phenol polymer, the repeating units represented by the following general formulae (1) to (4) may be contained alone, or may be contained in combination of two or more thereof.

[Chemical Formula 1]

(1)

[Chemical Formula 2]

(2)

-continued

[Chemical Formula 3]

(3)

[Chemical Formula 4]

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represents a hydroxyl group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxyl group or a hydroxyalkyl group. A number average molecular weight of the aminated phenol polymer having repeating units represented by the general formulae (1) to (4) is preferably 500 or more and 1000000 or less, and more preferably about 1000 or more and 20000 or less, for example.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the metal layer 3 in the chemical conversion treatment is not particularly limited, but for example when the chromate treatment is performed, it is desirable that the chromic acid compound be contained in an amount of about 0.5 mg or more and about 50 mg or less, preferably about 1.0 mg or more and about 40 mg or less, in terms of chromium, the phosphorus compound be contained in an amount of about 0.5 mg or more and about 50 mg or less, preferably about 1.0 mg or more and about 40 mg or less, in terms of phosphorus, and the aminated phenol polymer be contained in an amount of about 1 mg or more and about 200 mg or less, preferably about 5.0 mg or more and about 150 mg or less, per 1 $m^2$ of the surface of the metal layer 3.

The chemical conversion treatment is performed in the following manner: a solution containing a compound to be used for formation of an acid resistance film is applied to the surface of the metal layer by a bar coating method, a roll coating method, a gravure coating method, an immersion method or the like, and heating is then performed so that the temperature of the metal layer is about 70° C. or more and 200° C. or less. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Heat-Sealable Resin Layer 4]

In the battery packaging material according to the present invention, the heat-sealable resin layer 4 corresponds to the innermost layer, and during construction of a battery, the heat-sealable resin layer is heat-welded to itself to hermetically seal the battery element.

The resin component to be used in the heat-sealable resin layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The heat-sealable resin layer 4 may be formed from one resin component alone, or may be formed from a blend polymer obtained by combining two or more resin components. Further, the heat-sealable resin layer 4 may be formed of only one layer, but may be formed of two or more layers with the same resin component or different resin components.

While the thickness of the heat-sealable resin layer 4 is not particularly limited as long as a function as a heat-sealable resin layer is performed, and the battery packaging material satisfies the above-mentioned properties, it is, for example, about 10 or more and 40 μm or less, preferably about 15 μm or more and 40 μm or less.

[Adhesive Layer 5]

In the battery packaging material according to the present invention, the adhesive layer 5 is a layer that is provided between the metal layer 3 and the heat-sealable resin layer 4 as necessary for strongly bonding these layers to each other.

The adhesive layer 5 is formed from an adhesive capable of bonding the metal layer 3 and the heat-sealable resin layer 4 to each other. The bonding mechanism, the kind of the adhesive agent component, and so on for the adhesive agent to be used for formation of the adhesive layer 5 are the same as those for the adhesive layer 2. The adhesive component to be used in the adhesive layer 5 is preferably a polyolefin-based resin, further preferably a carboxylic acid-modified polyolefin, especially preferably carboxylic acid-modified polypropylene.

While the thickness of the adhesive layer 5 is not particularly limited as long as a function as an adhesive layer is performed, and the battery packaging material satisfies the above-mentioned properties, it is, for example, about 2 μm or more and 50 μm or less, preferably about 10 μm or more and 40 μm or less.

[Surface Coating Layer]

In the battery packaging material according to the present invention, a surface coating layer (not illustrated) may be provided on the base material layer 1 (on the base material layer 1 on a side opposite to the metal layer 3) as necessary for the purpose of, for example, improving designability, electrolytic solution resistance, scratch resistance and moldability. The surface coating layer is a layer that is situated at an outermost layer when a battery is assembled.

The surface coating layer can be formed from, for example, polyvinylidene chloride, a polyester resin, a urethane resin, an acrylic resin, an epoxy resin, or the like. Preferably, the surface coating layer is formed from a two-liquid curable resin among the resins described above. Examples of the two-liquid curable resin that forms the surface coating layer include two-liquid curable urethane resins, two-liquid curable polyester resins and two-liquid curable epoxy resins. The surface coating layer may contain a matting agent.

Examples of the matting agent include fine particles having a particle size of about 0.5 nm or more and 5 μm or less. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The method for forming a surface coating layer is not particularly limited, and examples thereof include a method in which a two-liquid curable resin for forming a surface coating layer is applied to one of the surfaces of the base material layer 1. In the case where a matting agent is blended, the matting agent may be added to and mixed with the two-liquid curable resin, followed by applying the mixture.

While the thickness of the surface coating layer is not particularly limited as long as the function as a surface coating layer is performed, and the battery packaging material satisfies the above-mentioned properties, it is, for example, about 0.5 μm or more and 10 μm or less, preferably about 1 μm or more and 5 μm or less.

3. Method for Producing Battery Packaging Material

The method for producing a battery packaging material according to the present invention is not particularly limited as long as a laminate including layers each having a predetermined composition is obtained, and a production method can be employed which includes the step of preparing a laminate by laminating at least a base material layer, an adhesive layer, a metal layer and a heat-sealable resin layer in this order, the base material layer 1 having the following properties:

a tensile elastic modulus of the base material layer in each of one direction and other direction orthogonal to the one direction on the same plane is 400 N/15 mm or more and 1000 N/15 mm or less, and the absolute value of a difference between the tensile elastic moduli of the base material layer in one direction and the other direction is 150 N/15 mm or less.

That is, by laminating the layers while using as the base material layer 1 the base material layer 1 described in the section "2. layers forming battery packaging material", the battery packaging material according to the present invention can be produced.

One example of the method for producing a battery packaging material according to the present invention is as follows. First, a laminate including the base material layer 1, the adhesive layer 2 and the metal layer 3 in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as a gravure coating method or a roll coating method, and dried, the metal layer 3 or the base material layer 1 is then laminated, and the adhesive layer 2 is cured.

Then, the heat-sealable resin layer 4 is laminated on the metal layer 3 of the laminate A. When the heat-sealable resin layer 4 is laminated directly on the metal layer 3, a resin component that forms the heat-sealable resin layer 4 may be applied onto the metal layer 3 of the laminate A by a method such as a gravure coating method or a roll coating method. When the adhesive layer 5 is provided between the metal layer 3 and the heat-sealable resin layer 4, mention is made of, for example, (1) a method in which the adhesive layer 5 and the heat-sealable resin layer 4 are co-extruded to be laminated on the metal layer 3 of the laminate A (co-extrusion lamination method); (2) a method in which the adhesive layer 5 and the heat-sealable resin layer 4 are laminated to form a laminate separately, and the laminate is laminated on the metal layer 3 of the laminate A by a thermal lamination method; (3) a method in which an adhesive for formation of the adhesive layer 5 is laminated on the metal layer 3 of the laminate A by an extrusion method or a method in which the adhesive is applied by solution coating, dried at a high temperature and baked, and the heat-sealable resin layer 4 formed in a sheet shape beforehand is laminated on the adhesive layer 5 by a thermal lamination method; and (4) a method in which the melted adhesive layer 5 is poured between the metal layer 3 of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination).

When a surface coating layer is provided, the surface coating layer is laminated on a surface of the base material layer 1 on a side opposite to the metal layer 3. The surface coating layer can be formed by, for example, coating a surface of the base material layer 1 with the resin that forms the surface coating layer. The order of the step of laminating the metal layer 3 on a surface of the base material layer 1 and the step of laminating the surface coating layer on a surface of the base material layer 1 is not particularly limited. For example, the surface coating layer may be formed on a surface of the base material layer 1, followed by forming the metal layer 3 on a surface of the base material layer 1 on a side opposite to the surface coating layer.

A laminate including the surface coating layer provided as necessary, the base material layer 1, the adhesive layer 2, the metal layer 3, the surface of which is subjected to a chemical conversion treatment as necessary, the adhesive layer 5 provided as necessary, and the heat-sealable resin layer 4 is formed in the manner described above, and the laminate may be further subjected to a heating treatment of a hot roll contact type, a hot air type, a near- or far-infrared type, or the like for strengthening the adhesion of the adhesive layer 2 and the adhesive layer 5 provided as necessary. As conditions for such a heating treatment, for example, the temperature is 150° C. or more and 250° C. or less, and the time is 1 minute or more and 5 minutes or less.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging material according to the present invention is used as a packaging material for hermetically sealing and storing battery elements such as a positive electrode, a negative electrode and an electrolyte. That is, in a battery according to the present invention, a battery element including at least a positive electrode, a negative electrode and an electrolyte is stored in a package formed of the battery packaging material according to the present invention.

Specifically, a battery element including at least a positive electrode, a negative electrode and an electrolyte is covered with the battery packaging material according to the present invention such that a flange portion (region where a heat-sealable resin layer is in contact with itself) can be formed on the periphery of the battery element while a metal terminal connected to each of the positive electrode and the negative electrode protrudes to the outside, and the heat-sealable resin layer at the flange portion is heat-sealed with itself, thereby providing a battery using a battery packaging material. When the battery element is stored using the battery packaging material according to the present invention, the battery packaging material according to the present invention is used such that the sealant portion is on the inner side (surface in contact with the battery element).

The battery packaging material according to the present invention may be used for either a primary battery or a secondary battery, but is preferably used for a secondary battery. The type of a secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted that the present invention is not limited to the examples.

Examples 1 to 8 and Comparative Examples 1 to 22

<Production of Battery Packaging Material>

A metal layer formed of an aluminum foil (thickness: 30 μm) subjected to a chemical conversion treatment at both surfaces was laminated on a base material layer using a dry lamination method. Specifically, a two-liquid urethane adhesive (polyol compound and aromatic isocyanate-based compound) was applied to one surface of the aluminum foil, so that an adhesive layer (thickness: 3 μm) was formed on the metal layer. The adhesive layer on the metal layer and the base material layer were then laminated to each other by a dry lamination method, and an aging treatment was performed at 40° C. for 24 hours to prepare a laminate of base material layer/adhesive layer/metal layer. The chemical conversion treatment of the aluminum foil used as the metal layer was performed by applying to both the surfaces of the aluminum foil a treatment liquid including a phenol resin, a chromium fluoride compound and phosphoric acid using a roll coating method in such a manner that the application amount of chromium was 10 mg/m² (dry mass), and performing baking for 20 seconds under such conditions that the film temperature was 180° C. or higher. Carboxylic acid-modified polypropylene (disposed on the metal layer side) in a thickness of 20 μm and random polypropylene (innermost layer) in a thickness of 20 μm were then co-extruded onto the metal layer of the laminate to laminate an adhesive layer and a heat-adhesive resin layer on the metal layer. Specific materials of the layers, which were used in examples and comparative examples, are as shown below and in Table 1.

<Base material layer 1>

Details of biaxially stretched nylon films 1 to 6, polyethylene terephthalate/nylon two-layer films 1 and 2, polypropylene films 1 and 2, unstretched nylon films 1 and 2 and polyethylene terephthalate films 1 and 2, which were used as the base material layer 1, are shown below. The tensile elastic moduli shown in Table 1 were each measured by a method conforming to JIS K 7161-1994.

<Nylon films 1 and 6>

An unstretched raw film formed of a raw material mainly composed of nylon 6 was simultaneously biaxially stretched by a tubular method, and then heat-treated at 210° C. to produce a nylon film. The nylon film 1 (Ny1) was produced under the condition of a draw ratio of 3.0 in the machine direction (MD) and a draw ratio of 3.2 in the traverse direction (TD), and the nylon film 6 (Ny6) was produced under the condition of a draw ratio of 2.9 in the machine direction (MD) and a draw ratio of 3.1 in the traverse direction (TD).

<Nylon Films 2 to 5>

An unstretched raw film formed of a raw material mainly composed of nylon 6 was sequentially biaxially stretched by a tenter method, and then heat-treated at 210° C. to produce a nylon film. The nylon film 2 (Ny2) was produced under the condition of a draw ratio of 3.0 in the machine direction (MD) and a draw ratio of 3.3 in the traverse direction (TD), the nylon film 3 (Ny3) was produced under the condition of a two-stage draw ratio of 1.6+2.1 in the machine direction (MD) and a draw ratio of 4.0 in the traverse direction (TD), the nylon film 4 (Ny4) was produced under the condition of a draw ratio of 2.7 in the machine direction (MD) and a draw ratio of 3.5 in the traverse direction (TD), and the nylon film 5 (Ny5) was produced under the condition of a draw ratio of 3.0 in the machine direction (MD) and a draw ratio of 3.3 in the traverse direction (TD).

<Unstretched Nylon Films 1 and 2>

A raw material mainly composed of nylon 6 was melted and extruded in a sheet form through a T die, and then brought into close contact with a rotating drum by an air knife casting method to be rapidly cooled, thereby producing a nylon film. The unstretched nylon film 1 (CN1) was produced at an extrusion temperature of 270° C. and a drum temperature of 50° C., and the unstretched nylon film 2 (CN2) was produced at an extrusion temperature of 260° C. and a drum temperature of 25° C.

<Polyethylene Terephthalate Films 1 and 2>

An unstretched raw film formed of a raw material mainly composed of polyethylene terephthalate was sequentially biaxially stretched by a tenter method, and then heat-treated at 200° C. to produce a PET film. The polyethylene terephthalate film 1 (PET1) was produced under the condition of a draw ratio of 4.7 in the machine direction (MD) and a draw ratio of 5.5 in the traverse direction (TD), and the polyethylene terephthalate film 2 (PET2) was produced under the condition of a draw ratio of 5.3 in the machine direction (MD) and a draw ratio of 6.4 in the traverse direction (TD).

<Polyethylene Terephthalate/Nylon Two-Layer Films 1 and 2>

An unstretched raw film including a layer A, a layer B and a layer C and mainly composed of a resin as shown below was sequentially biaxially stretched by a tenter method, and then heat-treated at 210° C. to produce a PET film. The polyethylene/nylon two-layer film 1 (PET/Ny1) was produced under the condition of a layer A/layer B/layer C ratio of 5/1/19 and a draw ratio of 3.2 in the machine direction (MD) and a draw ratio of 3.4 in the traverse direction (TD), and polyethylene/nylon two-layer film 2 (PET/Ny2) was produced under the condition of a layer A/layer B/layer C ratio of 4/1/10 and a draw ratio of 3.0 in the machine direction (MD) and a draw ratio of 4.0 in the traverse direction (TD).

The polyethylene terephthalate film was situated at an outermost surface (on a side opposite to the metal layer).

Layer A: raw material mainly composed of polyethylene terephthalate

Layer B: raw material mainly composed of maleic anhydride-modified polyolefin

Layer C: raw material mainly composed of nylon 6

<Polypropylene Films 1 and 2>

An unstretched raw film formed of a raw material mainly composed of random polypropylene was sequentially biaxially stretched by a tenter method, and then heat-treated at 160° C. to produce a PP film. The polypropylene film 1 (PP1) was produced under the condition of a draw ratio of 11.0 in the machine direction (MD) and a draw ratio of 6.0 in the traverse direction (TD), and the polypropylene film 2 (PP2) was produced under the condition of a draw ratio of 8.0 in the machine direction (MD) and a draw ratio of 7.0 in the traverse direction (TD).

<Metal Layer 3>

30 μm-thick soft aluminum (JIS H4160 A8021H-O) was used. Annealing conditions were changed to obtain five aluminum foils (ALM1 to 5) having different yield strengths. The yield strength of the aluminum foil was measured by a tension test (total elongation method) defined in JIS Z 2241.

<Adhesive Layer 2>

For the adhesive layer 2 for bonding the base material layer 1 and the metal layer 3 to each other, a urethane resin-based adhesive obtained by mixing in a ratio of 1:3 a polyol compound having a glass transition point of −5° C. or more and 5° C. or less, a weight average molecular weight of $10 \times 10^3$ or more and $40 \times 10^3$ or less and a hydroxyl group equivalent of 0.7/mol or more and 1.9/mol or less and an aromatic isocyanate mainly composed of a trimethylolpropane (TMP) adduct of toluene diisocyanate (TDI) was used.

<Adhesive Layer 5>

For the adhesive layer 5 for bonding the heat-sealable resin layer 4 and the metal layer 3 to each other, random type polypropylene-based unsaturated carboxylic acid-modified polypropylene having a Vicat softening point of 105° C. and a melting point of 146° C. was used.

<Heat-Sealable Resin Layer 4>

Random polypropylene containing 700 ppm of erucic acid amide and having a melting point of 142° C., a melt index of 10 g/min and an ethylene content of 7% was used.

(Evaluation of Moldability)

Each battery packaging material obtained as described above was cut to a rectangle of 80 mm×120 mm to prepare a sample. Using a mold (female mold) having an opening size of 30 mm×50 mm and a corresponding mold (male mold), the sample was cold-molded while the molding depth was changed by units of 0.5 mm from the molding depth of 0.5 mm under a pressing force of 0.4 MPa. This procedure was carried out for 10 samples at each depth. For the sample after the cold molding, the deepest of depths at which none of the 10 samples had creases, and pinholes and cracks in the aluminum foil was defined as the limit molding depth of the sample. From the limit depth, the moldability of the battery packaging material was evaluated in accordance with the following criteria. The results are shown in Table 1.

A: the limit molding depth is more than 6.5 mm.
B: the limit molding depth is 5.5 mm or more and 6.5 mm or less.
C: the limit molding depth is 4.0 mm or more and less than 5.5 mm.
D: the limit molding depth is 3.5 mm or less.

(Evaluation of Curling in Molding)

Each battery packaging material obtained as described above was cut to prepare a strip piece of 150×100 mm, and the strip piece was used as a test sample. A straight mold including a rectangular male mold of 30 mm×50 mm, and a female mold with a clearance of 0.5 mm from the male mold was prepared, the test sample was placed on the female mold in such a manner that the heat-sealable resin layer 4 was situated on the male mold side, the test sample was pressed at a pressing pressure (surface pressure) of 0.1 MPa in such a manner that the molding depth was 6 mm, and cold molding (draw-in one-step molding) was performed. Details of the position at which molding was performed are as shown in FIG. 3. Molding was performed at a position where the shortest distance d between a rectangular molded part M and an end part P of a battery packaging material 10 is 25 mm as shown in FIG. 4. Next, the battery packaging material 10 after molding was placed on a horizontal surface in a manner as shown in FIG. 4, and the maximum value t of a distance between the horizontal surface 20 and the end part P in a vertical direction y was defined as the maximum height of a curled portion. The evaluation criteria for curling after molding are as described below. The results are shown in Table 1.

A: the value t is 0 mm or more and less than 10 mm, curling is small, and productivity is hardly deteriorated.
B: the value t is 10 mm or more and less than 20 mm, and curling is slightly large, but deterioration of productivity is small.
C: the value t is 20 mm or more and less than 30 mm, curling is large, and deterioration of productivity is large.
D: the value t is 30 mm or more, curling is very large, and deterioration of productivity is very large.

TABLE 1

| | | | Base material layer | | | | Metal layer | | | | |
| | | | | Tensile elastic modulus [N/15 mm] | | | | Yield strength [N/15 mm] | | | Curling |
| | Resin | Thickness [μm] | One direction | Other direction | One direction − other direction | ALM | One direction | Other direction | One direction − other direction | Mold-ability | after molding |
|---|---|---|---|---|---|---|---|---|---|---|---|
| Example 1 | Ny1 | 15 | 529 | 450 | 79 | ALM1 | 28.5 | 27.8 | 0.72 | A | A |
| Example 2 | Ny2 | 25 | 563 | 518 | 45 | | | | | A | A |
| Example 3 | PET1 | 16 | 941 | 965 | 24 | | | | | A | A |
| Example 4 | PET/Ny1 | 15 (3/12) | 810 | 675 | 135 | | | | | A | A |
| Comparative Example 1 | Ny3 | 12 | 265 | 176 | 89 | | | | | D | D |
| Comparative Example 2 | Ny3 | 15 | 331 | 221 | 110 | | | | | D | C |
| Comparative Example 3 | Ny4 | 15 | 743 | 428 | 315 | | | | | D | A |
| Comparative Example 4 | Ny6 | 15 | 317 | 247 | 70 | | | | | D | C |
| Comparative Example 5 | Ny3 | 25 | 551 | 368 | 183 | | | | | C | A |
| Comparative Example 6 | Ny4 | 25 | 1238 | 713 | 525 | | | | | D | B |
| Comparative Example 7 | Ny5 | 25 | 1013 | 788 | 225 | | | | | D | A |
| Comparative Example 8 | Ny6 | 25 | 495 | 386 | 109 | | | | | D | C |
| Comparative Example 9 | CN1 | 20 | 213 | 258 | 45 | | | | | D | C |
| Comparative Example 10 | CN2 | 20 | 165 | 165 | 0 | | | | | D | D |
| Comparative Example 11 | CN2 | 30 | 248 | 256 | 8 | | | | | D | C |
| Comparative Example 12 | PET2 | 16 | 1152 | 1128 | 24 | | | | | C | A |
| Comparative Example 13 | PET2 | 25 | 1800 | 1763 | 37 | | | | | D | A |
| Comparative Example 14 | PET1 | 25 | 1470 | 1508 | 38 | | | | | D | A |
| Comparative Example 15 | PP1 | 20 | 660 | 1350 | 690 | | | | | D | B |
| Comparative Example 16 | PP2 | 20 | 585 | 1140 | 555 | | | | | D | B |
| Comparative Example 17 | PP2 | 25 | 731 | 1425 | 694 | | | | | D | B |

TABLE 1-continued

| | | | Base material layer | | | Metal layer | | | | |
|---|---|---|---|---|---|---|---|---|---|---|
| | | | | Tensile elastic modulus [N/15 mm] | | | | Yield strength [N/15 mm] | | Curling |
| | Resin | Thickness [μm] | One direction | Other direction | One direction – other direction | ALM | One direction | Other direction | One direction – other direction | Mold-ability | after molding |
| Comparative Example 18 | PET/Ny2 | 25 (5/20) | 1350 | 1125 | 225 | | | | | C | A |
| Example 5 | Ny1 | 15 | 529 | 450 | 79 | ALM2 | 37.2 | 36.7 | 0.5 | A | A |
| Example 6 | Ny1 | 15 | | | | ALM3 | 57.8 | 55.5 | 2.3 | B | A |
| Example 7 | Ny1 | 15 | | | | ALM4 | 83.2 | 82.9 | 0.3 | B | A |
| Example 8 | Ny1 | 15 | | | | ALM5 | 46.6 | 46.0 | 0.6 | A | A |
| Comparative Example 19 | Ny3 | 15 | 331 | 221 | 110 | ALM2 | 37.2 | 36.7 | 0.5 | D | C |
| Comparative Example 20 | Ny3 | 15 | | | | ALM3 | 57.8 | 55.5 | 2.3 | D | C |
| Comparative Example 21 | Ny3 | 15 | | | | ALM4 | 83.2 | 82.9 | 0.3 | D | B |
| Comparative Example 22 | Ny3 | 15 | | | | ALM5 | 46.6 | 46.0 | 0.6 | D | B |

The symbols in Table 1 are as follows.
Ny: Nylon
PET: Polyethylene terephthalate
PET/Ny: Polyethylene terephthalate/nylon two-layer film
PP: Polypropylene
CN: Unstretched nylon From the results shown in Table 1, it is evident that the battery packaging materials in Examples 1 to 8 where the tensile elastic modulus of the base material layer in each of one direction and other direction orthogonal to the one direction on the same plane was 400 N/15 mm or more and 1000 N/15 mm or less, and the absolute value of a difference between the tensile elastic moduli of the base material layer in the one direction and the other direction was 150 N/15 mm or less, generation of pinholes and cracks were remarkably suppressed, and favorable moldability was exhibited. The battery packaging materials in Examples 1 to 8 were inhibited from curling after molding.

The battery packaging materials in Comparative Examples 1 to 22 which did not satisfy all of the above-mentioned requirements were inferior in moldability to the battery packaging materials in Examples 1 to 8, and some of these battery packaging materials curled after molding.

DESCRIPTION OF REFERENCE SIGNS

1: Base material layer
2: Adhesive layer
3: Metal layer
4: Heat-sealable resin layer
5: Adhesive layer
10: Battery packaging material
M: Molded part
P: End part

The invention claimed is:

1. A battery packaging material including a laminate including at least a base material layer, an adhesive layer, a metal layer and a heat-sealable resin layer in this order, wherein:
the base material layer is formed of a single-layer resin film or a two-layer resin film,
a tensile elastic modulus of the base material layer in each of one direction and other direction orthogonal to the one direction on the same plane is 400 N/15 mm or more and 1000 N/15 mm or less, and
an absolute value of a difference between the tensile elastic moduli of the base material layer in the one direction and the other direction is 150 N/15 mm or less.

2. The battery packaging material according to claim 1, wherein a thickness of the laminate is 100 μm or less.

3. The battery packaging material according to claim 1, wherein a thickness of the base material layer is 10 μm or more and 35 μm or less.

4. The battery packaging material according to claim 1, wherein a thickness of the metal layer is 10 μm or more and 35 μm or less.

5. The battery packaging material according to claim 1, wherein the base material layer contains at least one of a polyester resin and a polyamide resin.

6. The battery packaging material according to claim 1, wherein at least one surface of the metal layer is provided with an acid resistance film layer.

7. The battery packaging material according to claim 1, wherein the battery packaging material is a packaging material for a secondary battery.

8. A battery comprising a battery element including at least a positive electrode, a negative electrode and an electrolyte, the battery element being stored in a package formed of the battery packaging material according to claim 1.

9. A method for producing a battery packaging material, the method including preparing a laminate by laminating at least a base material layer, an adhesive layer, a metal layer and a heat-sealable resin layer in this order,
the base material layer being formed of a single-layer resin film or a two-layer resin film, and
the base material layer having the following properties:
a tensile elastic modulus of the base material layer in each of one direction and other direction orthogonal to the one direction on the same plane is 400 N/15 mm or more and 1000 N/15 mm or less, and
an absolute value of a difference between the tensile elastic moduli of the base material layer in one direction and the other direction is 150 N/15 mm or less.

10. The battery packaging material according to claim 1, wherein:
the base material layer is an outermost layer of the laminate and is directly laminated on the adhesive layer, and
the adhesive layer is directly laminated on the metal layer.

11. The method according to claim 9, wherein:
the base material layer is an outermost layer of the laminate and is directly laminated on the adhesive layer, and
the adhesive layer is directly laminated on the metal layer.

* * * * *